US008781532B2

(12) United States Patent
Gil et al.

(10) Patent No.: US 8,781,532 B2
(45) Date of Patent: Jul. 15, 2014

(54) CUSTOMIZED DATA RETRIEVAL APPLICATIONS FOR MOBILE DEVICES PROVIDING INTERPRETATION OF MARKUP LANGUAGE DATA

(75) Inventors: Elad Gil, Palo Alto, CA (US); Shumeet Baluja, Santa Clara, CA (US); Maryam Kamvar, San Francisco, CA (US); Cedric Beust, San Francisco, CA (US)

(73) Assignee: Google Inc., Mountain View, CA (US)

( * ) Notice: Subject to any disclaimer, the term of this patent is extended or adjusted under 35 U.S.C. 154(b) by 1489 days.

(21) Appl. No.: 11/229,980

(22) Filed: Sep. 19, 2005

(65) Prior Publication Data

US 2007/0066364 A1  Mar. 22, 2007

(51) Int. Cl.
 H04M 1/00 (2006.01)
 H04B 1/38 (2006.01)

(52) U.S. Cl.
 USPC .......................................................... 455/566

(58) Field of Classification Search
 USPC .............................................................. 707/1
 See application file for complete search history.

(56) References Cited

U.S. PATENT DOCUMENTS

| | | | |
|---|---|---|---|
| 6,501,956 B1 | 12/2002 | Weeren et al. ................ | 455/463 |
| 6,668,369 B1 | 12/2003 | Krebs et al. | |
| 6,675,204 B2 | 1/2004 | De Boor et al. ............... | 709/217 |
| 6,892,067 B1 | 5/2005 | Sharma et al. | |
| 7,051,080 B1 | 5/2006 | Paul et al. | |
| 2002/0099456 A1 | 7/2002 | McLean | |
| 2002/0165847 A1* | 11/2002 | McCartney et al. ............ | 707/1 |
| 2003/0135825 A1 | 7/2003 | Gertner et al. | |
| 2003/0182625 A1 | 9/2003 | Davidov et al. | |
| 2003/0182626 A1 | 9/2003 | Davidov et al. | |
| 2004/0012627 A1 | 1/2004 | Zakharia et al. | |
| 2004/0019683 A1 | 1/2004 | Lee et al. | |
| 2005/0034084 A1 | 2/2005 | Ohtsuki et al. | |
| 2005/0050474 A1 | 3/2005 | Bells et al. | |
| 2005/0139674 A1 | 6/2005 | Ishibashi et al. | |
| 2006/0026527 A1 | 2/2006 | Bells | |
| 2006/0074780 A1 | 4/2006 | Taylor et al. | |
| 2006/0107236 A1 | 5/2006 | Etgen | |
| 2006/0143297 A1 | 6/2006 | Korhonen et al. | |

FOREIGN PATENT DOCUMENTS

WO    WO 99/08182    2/1999

OTHER PUBLICATIONS

PCT International Search Report, PCT/US06/36482, Mar. 20, 2007, pp. 1-3.
Written Opinion of the International Searching Authority, PCT/US06/36482, Mar. 20, 2007, pp. 1-5.
PCT/US2006/036482, International Preliminary Report on Patentability, Apr. 3, 2008, pp. 1-7.

(Continued)

Primary Examiner — Ankur Jain
(74) Attorney, Agent, or Firm — Harrity & Harrity, LLP

(57) ABSTRACT

Systems and techniques, including computer software, for retrieving information to a mobile device involve installing a data retrieval application on the mobile device. The data retrieval application includes instructions for presenting a structured data display on the mobile device, defining a structure of the structured data display, requesting selected hyperlinks included in the structured data display, and rendering markup language information received in response to the selected hyperlinks. A user request to retrieve data through the data retrieval application is received, and data is retrieved in response to the received user request. The retrieved data is displayed according to the structure of the structured data display, and a user can select a hyperlink in the displayed data to retrieve and render markup language information using the data retrieval application.

19 Claims, 5 Drawing Sheets

(56) References Cited

OTHER PUBLICATIONS

David Eng, Combining static and dynamic data in code visualization, Proceedings of the 2002 ACM SIGPLAN-SIGSOFT workshop on Program analysis for software tools and engineering, pp. 43-45, published 2002 (7 pages).

Non-Final Office Action issued by the United States Patent and Trademark Office (13 pages); Notice of References (1 page); all mailed on Mar. 11, 2008 in U.S. Appl. No. 11/243,916 (Total 14 pages).

Final Office Action issued by the United States Patent and Trademark Office (15 pages); Notice of References (1 page); all mailed on Oct. 1, 2008 in U.S. Appl. No. 11/243,916 (Total 16 pages).

Advisory Action mailed by the United States Patent and Trademark Office on Dec. 17, 2008 in U.S. Appl. No. 11/243,916 (Total 3 pages).

Examiner Interview Summary mailed by the United States Patent and Trademark Office on Feb. 24, 2009 in U.S. Appl. No. 11/243,916 (Total 2 pages).

Non-Final Office Action issued by the United States Patent and Trademark Office (14 pages); Notice of References (1 page); all mailed on Apr. 17, 2009 in U.S. Appl. No. 11/243,916 (Total 15 pages).

Examiners First Report on Patent Application from Australian Government Patent Office, issued on Dec. 18, 2009 in Australian Patent Application No. 2006292266, (3 pages).

\* cited by examiner

US 8,781,532 B2

CUSTOMIZED DATA RETRIEVAL APPLICATIONS FOR MOBILE DEVICES PROVIDING INTERPRETATION OF MARKUP LANGUAGE DATA

TECHNICAL FIELD

This description relates to software applications for mobile devices, and more particularly to customized data retrieval applications that provide rendering of markup language data.

BACKGROUND

Handheld mobile devices, such as cellular telephones and personal digital assistants (PDAs), are becoming increasingly powerful both in terms of processing power and the ability to provide access to data. The usefulness of these enhancements is often limited, however, by an inability of mobile devices to display data effectively due to the small size of the display and the limited memory resources relative to laptop and desktop computers.

There are beginning to be some applications that are specifically designed for handheld mobile devices. Many such applications are based on application development platforms also specifically designed for mobile devices, such as Java 2 Platform Micro Edition (J2ME), Binary Runtime Environment for Wireless (BREW), and other software codes and/or operating systems. Some applications that are designed for retrieving data from a remote location to a handheld mobile device are browsers that correspond to conventional browser applications in that they enable users to enter uniform resource locators (URLs) to retrieve information from any Internet web site. Other applications enable data to be retrieved by launching a separate browser application in response, for example, to selecting a hyperlink in a user interface. In addition, specialized, limited functionality applications are available that provide a mechanism to access data from dedicated application service providers.

SUMMARY

Systems and techniques are provided for retrieving and displaying information on a mobile device by integrating markup language rendering functions into a specialized data retrieval client application.

In one general aspect, information is retrieved to a mobile device using a data retrieval application installed on the mobile device. The data retrieval application includes instructions for presenting a structured data display on the mobile device, defining a structure of the structured data display, requesting selected hyperlinks included in the structured data display, and rendering markup language information received in response to the selected hyperlinks. A user request to retrieve data is received through the data retrieval application. Data is retrieved in response to the received user request. The retrieved data is displayed according to the structure of the structured data display, and a user is able to select a hyperlink in the displayed data to retrieve and render markup language information using the data retrieval application.

Implementations can include one or more of the following features. The data retrieval application is a search application or an electronic mail client application. A search user interface having a structure defined by the search application installed on the mobile device is displayed. The search user interface includes a predefined field for a user entry of a search query, and the user request to retrieve data includes a submission of a search query. The structured data display defines a structure of a search results user interface for presenting data responsive to the search query. The data responsive to the search query includes a hyperlink. A user selection of the hyperlink is received using the search results user interface, and a request for additional data based on information included in the hyperlink is sent. The additional data is received in a markup language format, and the markup-language-formatted data is rendered by the data retrieval application for display on a user interface of the mobile device.

A display of data on the mobile device is automatically adjusted by the search application based on one or more characteristics of the mobile device. The structured data display includes one or more user-selectable features defined by the search application installed on the mobile device. The one or more user-selectable features are operable to perform operations defined by the search application. When a user selection of a hyperlink in the displayed data is received, markup language information is retrieved and rendered without accessing a browser application.

In another general aspect, a data retrieval user interface is displayed on a mobile device. The data retrieval user interface includes a structure defined by predetermined data stored on the mobile device. User-defined information is received through the data retrieval user interface. A data retrieval request including the user-defined information is sent to a predetermined remote location. A response to the data retrieval request is received, and the response includes retrieved data. A retrieved data user interface is displayed on the mobile device. The retrieved data user interface displays the retrieved data in accordance with a structure defined by predetermined data stored on the mobile device, and the retrieved data includes one or more hyperlinks. Markup-language-formatted data associated with a hyperlink selected by a user is retrieved, and the markup-language-formatted data is rendered on the mobile device without accessing a separate browser application.

Implementations can include one or more of the following features. The predetermined remote location is a pre-stored address on the mobile device, and an address for retrieving the markup-language-formatted data is identified in the retrieved data. The retrieved data includes structured data that has a structure corresponding to the structure for displaying the retrieved data. The structure for the data retrieval user interface or the structure for displaying the retrieved data includes a user interface component for launching a predefined function, and the user interface component and the predefined function are defined by data stored on the mobile device. The predefined function involves retrieving additional data, and an additional retrieved data user interface is displayed on the mobile device. The additional retrieved data user interface displays the additional retrieved data in accordance with a structure corresponding to the predefined function and defined by predetermined data stored on the mobile device. The instructions comprise software code written using at least one of Java, Java 2 Platform Micro Edition (J2ME), Binary Runtime Environment for Wireless (BREW), Symbian operating system, a native operating system, Linux, a Pocket PC operating system, Palm operating system, a Microsoft operating system, or any other mobile software platform.

The details of one or more implementations are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

Figure 1:
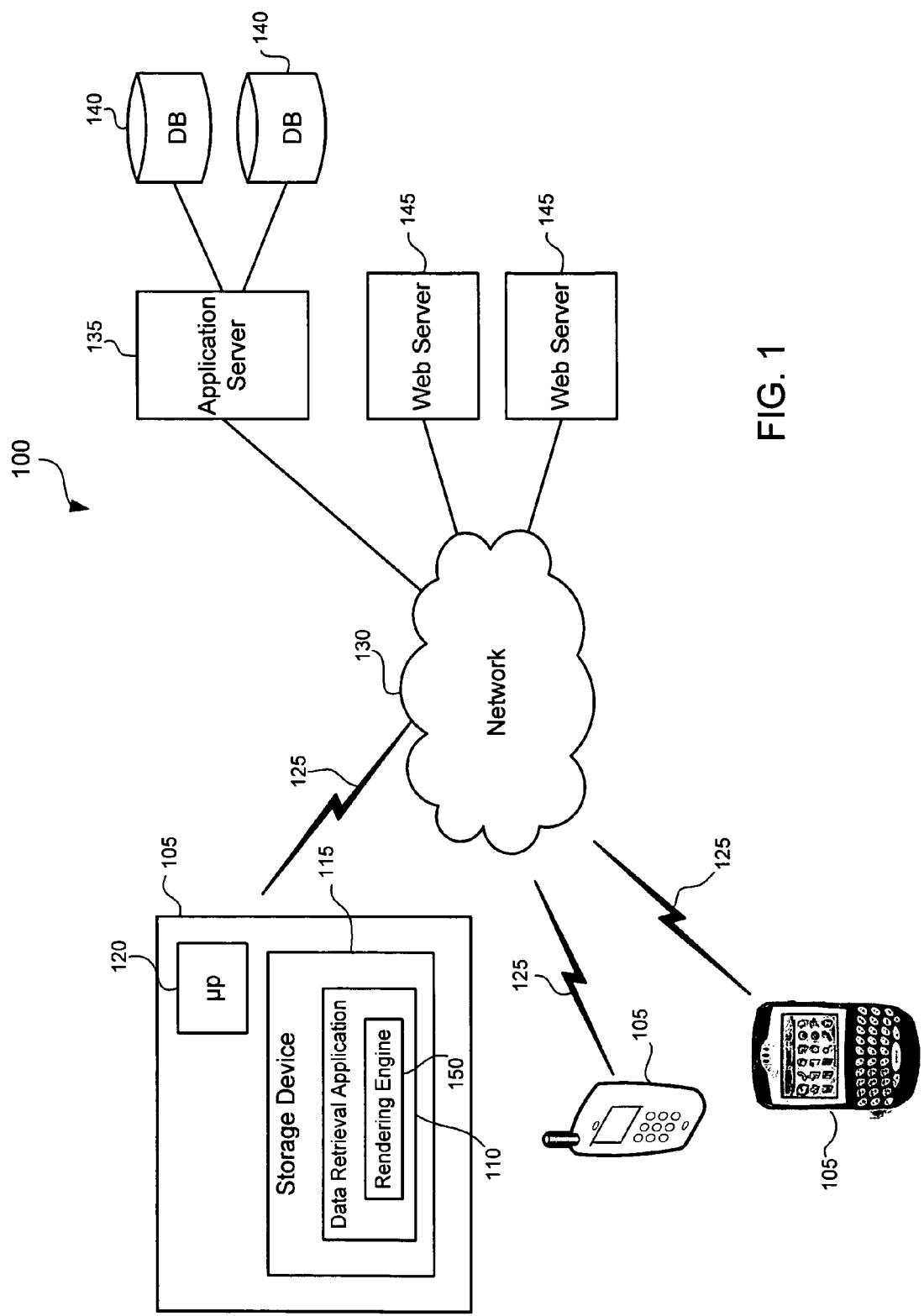
FIG. 1 is a block diagram of a system for retrieving data to a mobile device.

FIG. 1 is a block diagram of a system 100 for retrieving data to a mobile device 105. The mobile device 105 can be a cellular telephone, a PDA, or another type of handheld wireless communications device. The mobile device 105 is capable of executing one or more software applications, displaying information to a user, and receiving user input. The mobile device 105 includes a data retrieval application 110, such as a search application or an application for accessing a web-based electronic mail account, that is specially designed for use on mobile devices. The data retrieval application 110 is stored in a storage device 115 within the mobile device 105 and executes on a processor 120. The mobile device 105 operates to conduct wireless communications using a cellular, satellite, or other radio communication link 125 with other devices over a network 130. In particular, the mobile device 105 sends requests for data in accordance with instructions from the data retrieval application 110. The network 130 can include, for example, a public land mobile network, a public switched telephone network, a local area network, a wide area network, and/or any other type of telecommunication network.

The data retrieval application 110 generates graphical user interfaces (e.g., pages or views) that may include some of the features typically found on web pages that are used for retrieving data. For example, if the data retrieval application 110 is a search application, the graphical user interface displayed by the data retrieval application 110 can include one or more data entry fields for a user to define a search query or other search parameters, similar to a typical search engine website. For displaying search results, the graphical user interface displayed by the data retrieval application 110 can include a listing of search results, one or more data entry fields for a user to refine a search query or start a new search, and/or other features, such as links to other pages of the search results. If the data retrieval application 110 is an electronic mail application, the graphical user interface displayed by the data retrieval application 110 can include different mailboxes, such as an inbox, a mailbox for sent messages, and a mailbox for deleted messages. For each mailbox, the data retrieval application 110 can display a list or partial list of messages.

Web pages are generally written in hypertext markup language (HTML) and displayed using a browser application that interprets HTML tags included in the web page and determines how to represent the content (e.g., text and images) on a graphical user interface. Conventional search engines and web-based electronic mail services, for example, use HTML web pages. The content, appearance, and layout of such web pages is defined using HTML. When a user enters a URL for a search engine web page in a browser application, the browser retrieves the web page associated with the entered URL from a server location identified by the entered URL. The retrieved web page defines (or contains links to definitions) of the content, appearance, and layout of the information to be displayed. Other markup languages can be used instead of or in addition to HTML, including extensible hypertext markup language (XHTML), wireless markup language (WML), compact hypertext markup language (CHTML), extensible markup language (XML), and/or any other markup language.

Unlike a web page, the structure of the graphical user interfaces generated by the data retrieval application 110 is not defined in a retrieved web page. Instead, the data retrieval application 110 includes code defining a structure of a structured data display. The structure includes appearance aspects (e.g., what do displayed user interface components, text, graphics, and other displayed items look like) and layout aspects (e.g., how are items arranged on a display screen, where does a data entry field appear relative to a link to a help or menu feature, and the like). In general, the structure can be defined to account for features of the mobile device 105, such as screen size and available memory. For example, the structure may be defined to enable convenient viewing and scrolling on a mobile device display screen (e.g., to avoid excessive wrap-around of text and images by limiting the number of options presented and selecting font sizes that enable information to be logically arranged on the screen) and/or to account for potentially limited memory resources (e.g., by limiting the size and amount of unnecessary graphics). In some implementations, the data received by the data retrieval application 110 can be structured data, while in other implementations, the received data can be unstructured data.

In addition to structure, the structured data display can also include content, which can be defined by data that is retrieved from an application server 135. In general, information that is static, such as instructional text, labels, and headings, can be considered part of the appearance of the graphical user interface and is defined by the data retrieval application 110. Content data that is displayed by the data retrieval application 110, on the other hand, is generally retrieved from an application server 135. Content data includes dynamic information that is typically the primary basis for using the data retrieval application 110. For example, content data can include a listing of search results in a search application or a listing of messages in an electronic mail application. Content data can include snippets of information, which is a piece of the information available. For example, in an email application, a snippet may include a subject and a sender of the email, one or both of which may be truncated depending on their length and the amount of available space.

Although the content data can be considered to be distinct from the structure, the content data can be displayed in a graphical user interface in accordance with a structure defined by the data retrieval application 110. For example, the defined structure for an email graphical user interface may dictate that, for each message in a mailbox, a snippet of information is to be displayed, and the snippet includes one line of received date information, one line of sender information, and one line of subject information, with each line being truncated as necessary. Thus, the content is defined according to the data retrieved from the application server 135, while how the content data is displayed is defined according to the structure included in the data retrieval application 110 or otherwise stored on the mobile device 105 and accessed by the data retrieval application 110. In some situations, the structure can be defined to be dynamic. For example, a item in a list may typically include a snippet of only one or two lines of information unless the item is highlighted using a scrolling function, in which case the structure of the item may change to a snippet of three or four lines of information.

By storing data defining the structure of graphical user interfaces for the data retrieval application 110 in the data retrieval application 110 itself or otherwise on the mobile device 105, the graphical user interfaces can be conveniently customized according to the constraints and characteristics of the mobile device 105. For example, the structure of the graphical user interfaces can be formatted and adjusted in ways that are not supported by conventional HTML browsers. In some implementations, the graphical user interfaces can be specially designed or customized for use on mobile devices 105 in general, without necessarily being designed for a particular type of mobile device 105. Even without customization at the mobile device type level, substantial benefits can be achieved in terms of convenience and usability versus using a browser application to retrieve a web page that might be designed for use on full-size monitor.

In some implementations, the data retrieval application 110 is an application that is designed specifically for the type (e.g., manufacturer, product family, and/or model) of mobile device 105. In other implementations, the data retrieval application 110 is a generic application designed to run on a wide variety of mobile devices 105. In the latter case, the data retrieval application 110 can include software code for automatically extracting characteristics data and parameters of the mobile device 105. Based on the extracted information, the data retrieval application 110 can use built-in algorithms to determine customized structure data or to select from a set of predefined customized structure data. In either case, the structure data is maintained on the mobile device 105 for defining the structure of structured data displays for the data retrieval application 110. In some implementations, characteristics data and parameters can be manually entered by a user through a user interface. For purposes of this description, a user interface can include physical components through which a user can receive and/or provide information (e.g., a monitor, keyboard, display screen, mouse, speakers, and the like) and actual representations of information (e.g., sounds, graphical user interfaces and components thereof, text, images, etc.).

To facilitate portability and/or compatibility among different devices and type of devices, the data retrieval application 110 can be implemented, for example, on a Java platform, a J2ME platform, a BREW platform, a Symbian operating system, a native operating system, Linux, a Pocket PC operating system, a Palm operating system, a Microsoft operating system, or any other mobile software platform. The data retrieval application 110 can include software code defining the structure and other operations and features of the data retrieval application 110, or the structure, other operations, and/or other features of the data retrieval application 110 can be stored in one or more separate files on the mobile device 105. In some cases, the structure or certain elements of the structure can be defined using HTML that is stored on the device and interpreted by a rendering engine built into the data retrieval application 110.

Local storage of structure data also enables the structure to include functional aspects. The functional aspects of the structure and/or a structured data display can include specialized functions that are included in the graphical user interfaces of the data retrieval application 110 based on the type of application (e.g., search or email application) and/or the particular graphical user interface being displayed. For example, in a search application, the structured data display of a graphical user interface used to display results can include a button or other user interface component for sending a short message service (SMS) or email message of information regarding a selected item in a search results list. Similarly, the structured data display can include a user interface component for resubmitting a search query with additional parameters (e.g., search news articles or local information only or search for product listings), for retrieving additional structured data (e.g., driving directions or a map), or dialing a listing. Software code and/or data for defining the appearance, layout, and functional operations of user interface components that perform specialized functions is included in the data retrieval application 110 itself or otherwise stored on the mobile device 105.

The data retrieval application 110 can be associated with an application server 135 at a predetermined remote location, which can be identified by a predetermined address (e.g., a URL) stored in the data retrieval application 110 or on the mobile device 105. In some cases, the predetermined address can change on occasion, such as when the services provided by the application server 135 are moved to a different server. In such a case, it may be possible to update the stored predetermined address. In some implementations, the predetermined address may be associated with a server that assigns another address for handling a request from the data retrieval application 110 (e.g., for purposes of load distribution).

Although the application server 135 may be accessed using a URL in some implementations, the application server 135 can interact with the data retrieval application 110 in a different way than typical web servers interact with browser applications. In particular, the application server 135 does not necessarily simply return an HTML web page in response to a request from the data retrieval application 110. Instead, the application server 135 may format data in a manner that corresponds to the predefined structure of a graphical user interface for the data retrieval application 110. For example, the retrieved data can include structured data (e.g., snippets) without including HTML or other code relating to how to display the structured data. In addition, the retrieved data can be structured according to predefined data fields used for communicating between the application server 135 and the data retrieval application 110. In some implementations, however, the data retrieval application 110 may receive an ordinary HTML web page and may extract the relevant content data for display in a graphical user interface in accordance with the locally stored structure data rather than the HTML code included in the received web page.

In response to a request from the data retrieval application 110, the application server 135 can access information from one or more databases 140 associated with the application server 135 or from other servers 145 (e.g., servers supporting other web pages or otherwise maintaining additional data) through the network 130. The databases 140, for example, can include data previously mined from other web sites or can store messages and profile information (e.g., security information) associated with email accounts. In some cases, such as in response to a search query from a search application, the application server 135 may retrieve data from another server 145.

As discussed above, the data retrieval application 110 can include additional specialized functions, which can include requests for additional structured data. The additional structured data can also be presented in a graphical user interface having a structure that is predefined by the data retrieval application 110. In addition, some links that are presented by the data retrieval application 110 in a graphical user interface, if selected by a user, can result in retrieving additional data that is also presented in a graphical user interface having a structure that is predefined by the data retrieval application 110. For example, when a user selects a snippet for a particular email message, the email message may also be presented, in accordance with a predefined structure rather than using HTML code associated with the retrieved email message. In other words, the structure of the email message presentation is in accordance with the locally defined structure rather than that defined in the retrieved email message HTML.

In other cases, the retrieved data (i.e., the content data) that is presented in a graphical user interface can include hyperlinks (e.g., hypertext links and/or non-text-based links) to sources or data for which the data retrieval application 110 does not include a predefined structure. For example, in some implementations, each email snippet may constitute a hyperlink to the full email for which the data retrieval application 110 does not define a structure. If a user selects such a link, the data retrieval application 110 can retrieve a web page identified in the hyperlink and use a built-in markup language rendering engine 150 to render the retrieved markup-language-formatted data. As another example, retrieved data presented in a structured data display may include a hyperlink, which, if selected by a user, results in retrieving a web page from a server 145 associated with an address identified in the hyperlink.

In other words, the markup language rendering engine 150 is integrated into and included as part of the data retrieval application 110 in a single executable software application (e.g., the markup language rendering-engine 150 is compiled together with other modules of the data retrieval application 110). The markup language rendering engine 150 can operate in accordance with hypertext markup language (HTML), extensible hypertext markup language (XHTML), wireless markup language (WML), compact hypertext markup language (CHTML), extensible markup language (XML), and/or any other markup language.

Unlike conventional applications that support hypertext and other hyperlinks, which typically launch a separate, default browser application to retrieve data associated with a hyperlink, the data retrieval application 110 does not use an inter-application program call to launch or otherwise access the functionalities of a separate browser application. As a result, the data retrieval application 110 avoids the potential for an unsatisfactory user experience that can result from the delays generally inherent in activating a separate browser application and loading a web page. The data retrieval application 110 also provides for convenient access to a broad set of data associated with an initial set of retrieved data and allows viewing of results that are web-specific within the data retrieval client application 110.

Moreover, unlike browser applications, the data retrieval application 110 generally allows users to follow links that are included in retrieved data (or on pages that are retrieved through a link included in retrieved data) but not to otherwise surf the Internet or enter arbitrary website addresses or URLs because the data retrieval application 110 does not include an address bar. In some implementations, data rendered by the markup language rendering engine 150 and/or presented on a display can be formatted in a customized or partially customized manner (e.g., determining where to cut off lines of text, determining a size and/or resolution of images, and determining a number of lines in a snippet) based on one or more characteristics of the mobile device 105 (e.g., font metrics, screen width, amount of memory available, and screen height).

FIGS. 2A-2E illustrate a mobile device 205 operating in accordance with a search application to initiate a search. The mobile device includes a keyboard user interface 215 and a screen or display user interface 220, on which is displayed a search graphical user interface 225. The search graphical user interface 225, in this example, is a search query input page that includes a search query field 230 and an optional location field 235 but that does not include content data (i.e., because no data has been retrieved yet). The search graphical user interface 225 has a structure that is defined by the search application stored locally on the mobile device 205. Accordingly, when a user opens the search application on the mobile device 205, the search graphical user interface 225 can be displayed based on locally stored data and instructions, rather than retrieving the page from a remote server. In addition, the search graphical user interface 225 can be customized or substantially customized for use on the mobile device 205 (e.g., to provide a meaningful display without much if any scrolling).

Figure 2C:
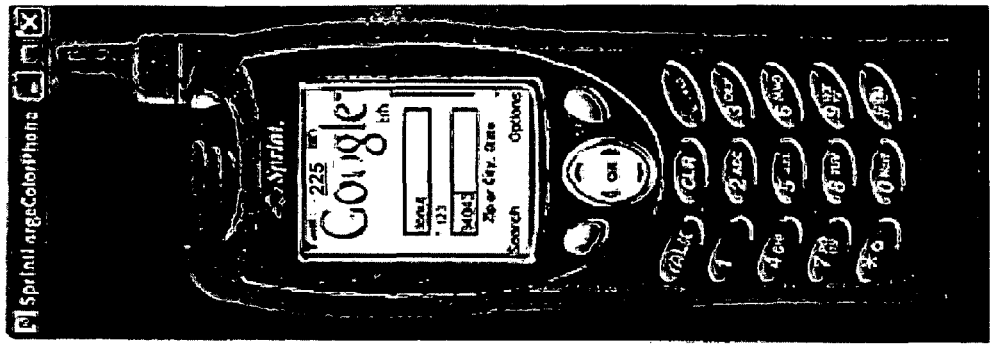
FIGS. 2A-2E illustrate a mobile device operating in accordance with a search application to initiate a search.
Figure 2B:
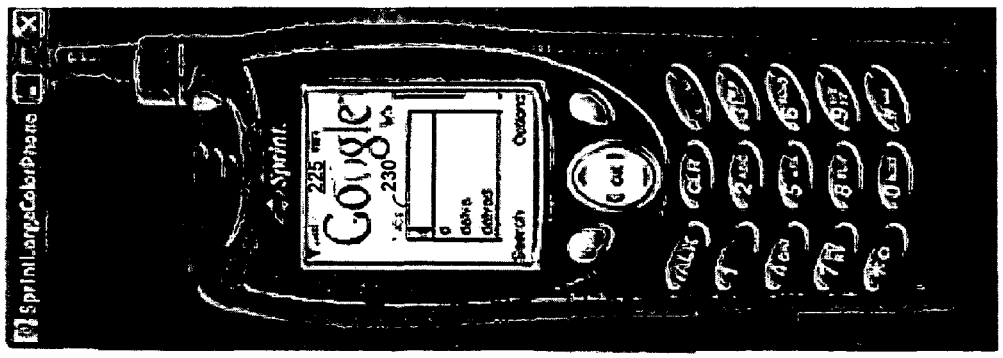
Figure 2A:
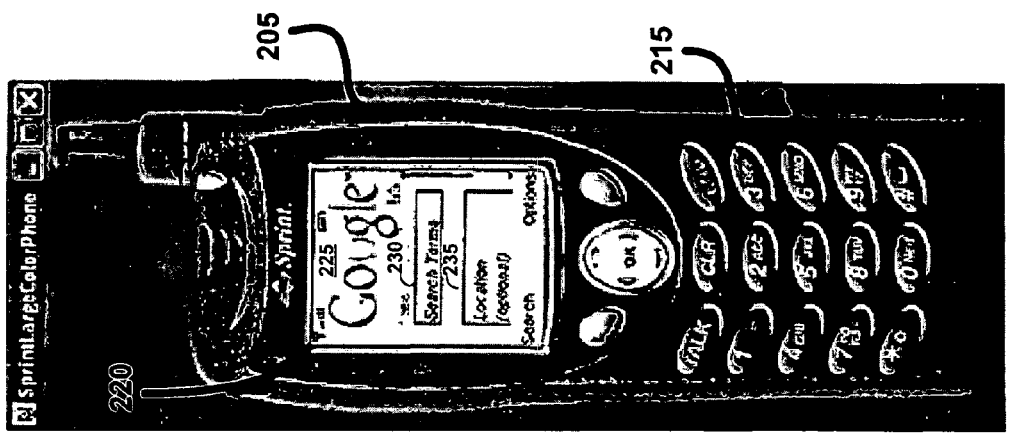
Figures 2D, 2E:
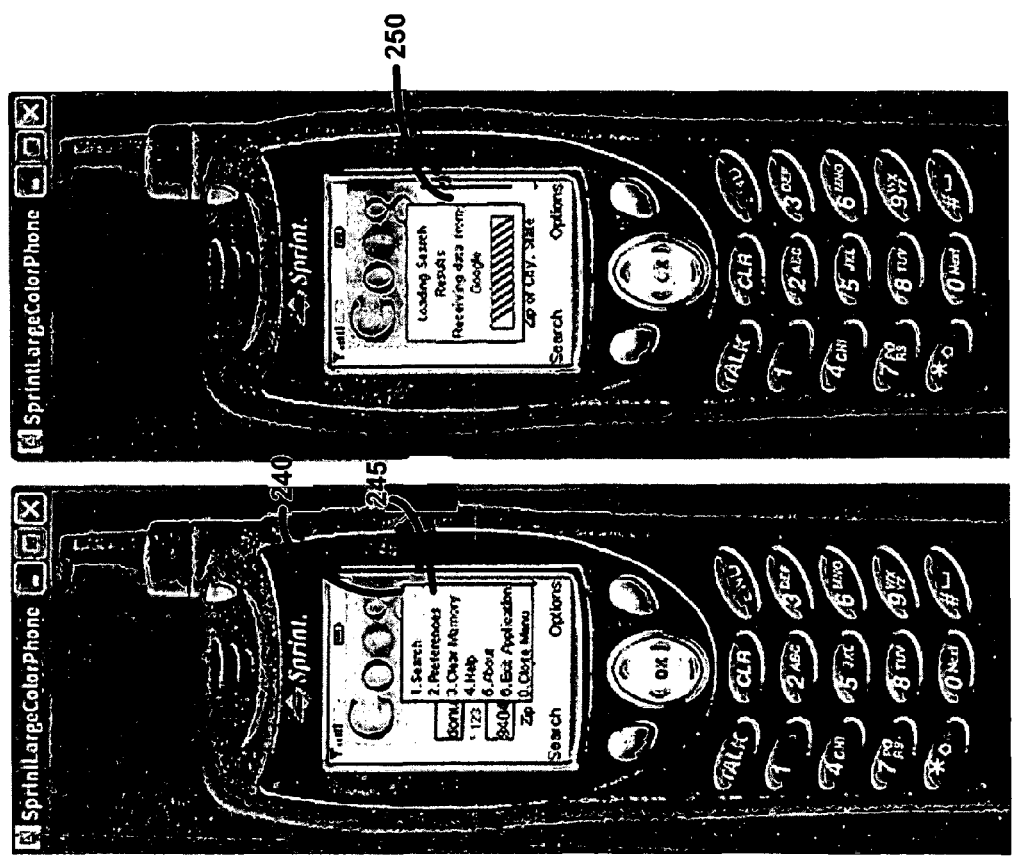

A user enters a search term in the search query field 230 (see FIGS. 2B and 2C) and a zip code in the optional location field 235 (see FIG. 2C). As a result of a user interaction with the keyboard user interface 215 (e.g., selecting "OK" or "Options"), the search application displays a pop-up options menu 240 on the search graphical user interface 225 (see FIG. 2D). The user can select (e.g., by pressing "OK") a search option 245, in response to which the search application sends a request (containing the user-selected query data) to retrieve responsive data to an application server. While waiting for results, the search application displays a "loading search results" message 250 (see FIG. 2E). Using the search application, all of the display operations depicted in FIGS. 2A-2E can be performed without receiving appearance, layout, or functional data from a remote server.

Figures 3A, 3B, 3C:
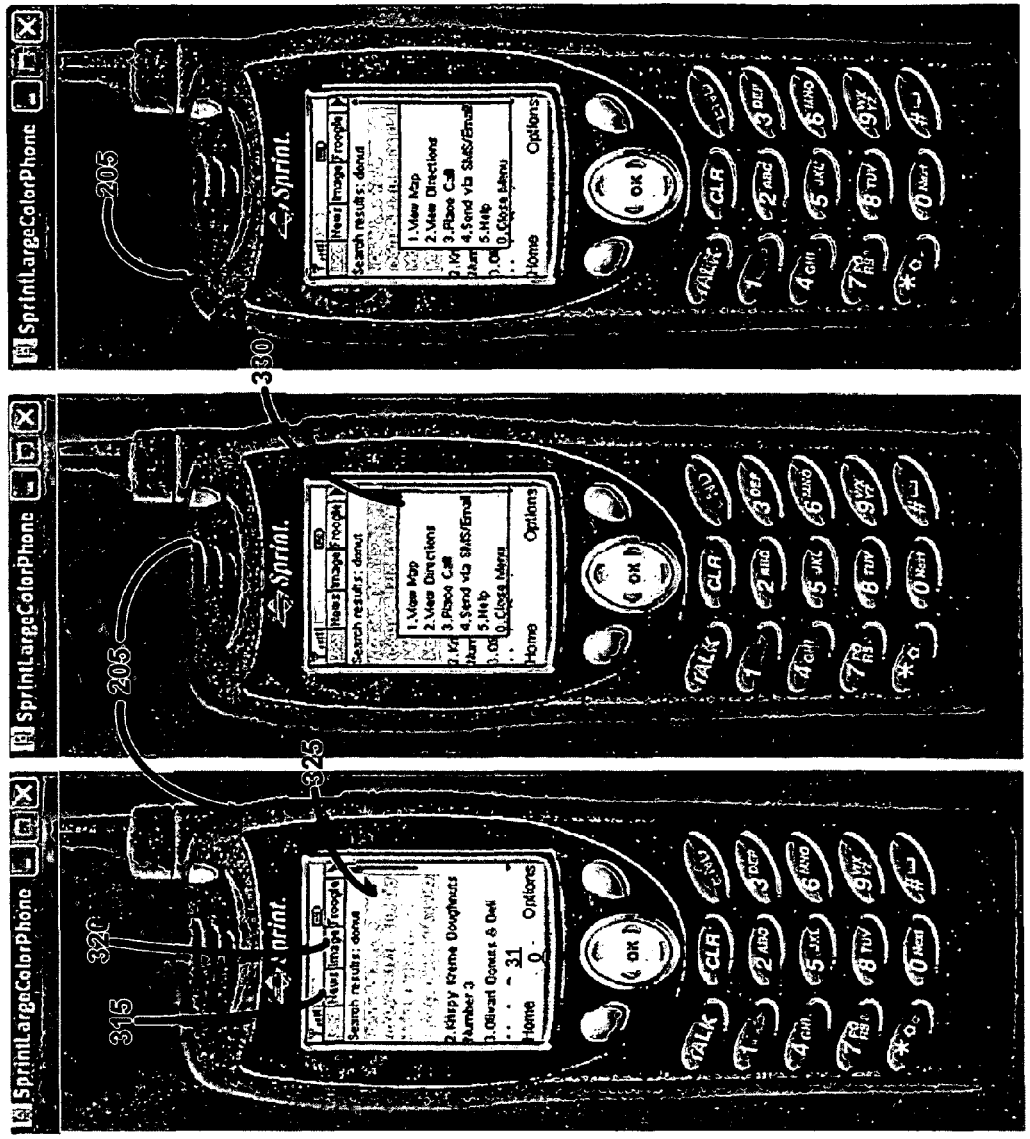
FIGS. 3A-3C illustrate the mobile device operating in accordance with a search application to display search results in response to the request of FIGS. 2A-2E.

FIGS. 3A-3C illustrate the mobile device 205 operating in accordance with a search application to display search results in response to the request of FIGS. 2A-2E. After receiving retrieved data in response to the request, the search application displays a results graphical user interface 310 that includes a list of search results in accordance with a structure defined by the search application. The list of search results includes content data received from the application server but is formatted according to the locally defined structure. In addition, the results graphical user interface 310 displays other data in accordance with functional aspects of a locally defined structure, including options to resubmit the search to obtain news results (at 315) or to obtain image results (at 320).

As also defined by the search application, by highlighting a particular search result 325 in the list, a larger snippet is displayed than for other results (see FIG. 3A). In response to a user selection of the particular search result 325, the search application displays a pop-up options menu 330 that includes additional functional options that can be applied to the particular search result 325 (see FIGS. 3B and 3C), which are defined by functional aspects of the structure for the search application. A user can scroll between options, a user selection of which initiates additional functionality of the locally stored search application. Although the search application defines the functionality of the additional functional aspects, it may or may not present results of such functions in accordance with a locally predefined structure, depending on the particular implementation. In addition, certain selections (e.g., selecting "OK" when the particular search result 325 is highlighted) can be a selection of a hyperlink, the results of which can be interpreted by a markup language rendering engine that is part of the search application.

Figure 4:
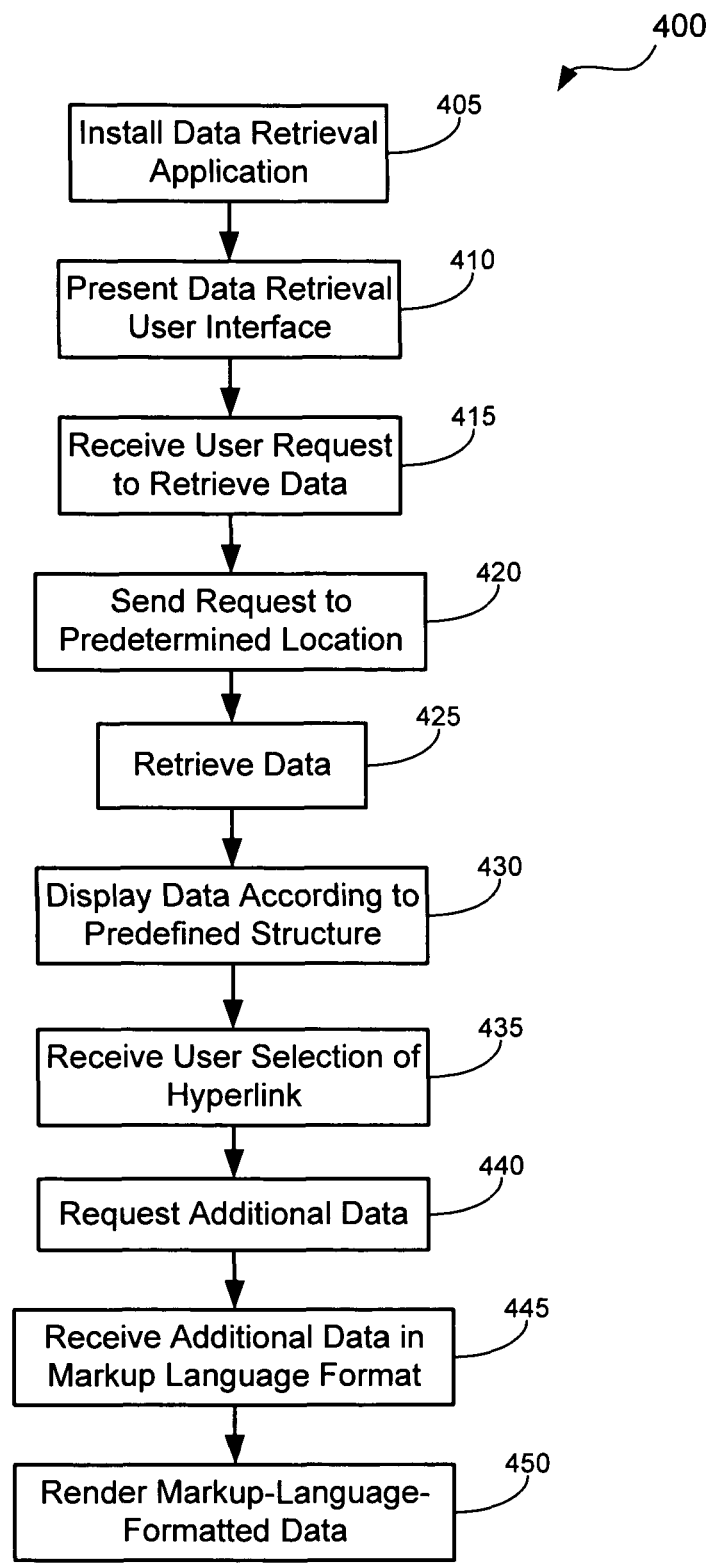
FIG. 4 is a flow diagram of a process for retrieving information to a mobile device.

FIG. 4 is a flow diagram of a process 400 for retrieving information to a mobile device. A data retrieval application is installed on the mobile device (405). The data retrieval application can be a search application, an email application, or some other data retrieval application. The data retrieval application can include instructions for presenting a structured data display on the mobile device, for defining a structure of the structured data display, for requesting selected hyperlinks included in the structured data display, and for rendering markup language information received in response to the selected hyperlinks. A data retrieval user interface is presented by the data retrieval application (410). The data retrieval user interface can have a structure defined by predetermined data stored on the mobile device. A user request to retrieve data is received through the data retrieval application (415). The user request can include user-defined information, such as a search query. In the case of a search application, for example, the data retrieval user interface can be a search request user interface having a structure defined by the search application, and the user request can be received through the search request user interface.

The user request is sent to a predetermined remote location (420), which can be defined by an address that is pre-stored on the mobile device. Data is retrieved in response to the received user request (425). The retrieved data is displayed according to a structure of a structured data display (430), which includes a structure defined by predetermined data stored on the mobile device. In the case of a search application, the structured data display can be a search results user interface.

In some cases, the displayed data includes one or more hyperlinks. In response to a user selection of a hyperlink (435), a request for additional data is sent based on information (e.g., an address or URL) included in the hyperlink (440). The additional data is received in a markup language format (445), and the markup-language-formatted data is rendered by the data retrieval application for display on a user interface of the mobile device (450). The rendering is performed without accessing a browser application. In some cases, the rendering of the markup-language-formatted data to generate a display (at 450) or displaying the structured data display (at 430) can include automatically adjusting the display of data on the mobile device based on one or more characteristics of the mobile device.

The systems and all of the functional operations described in this specification can be implemented in digital electronic circuitry, or in computer software, firmware, or hardware, including the structural means disclosed in this specification and structural equivalents thereof, or in combinations of them. The techniques can be implemented as one or more computer program products, i.e., one or more computer programs tangibly embodied in an information carrier, e.g., in a machine readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification can be performed by one or more programmable processors executing one or more computer programs to perform the described functions by operating on input data and generating output. The processes and logic flows can also be performed by, and apparatus can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, the processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, aspects of the described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The techniques can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made. For example, operations of the logic flows depicted in FIG. 4 can be performed in a different order than that shown and/or can be performed iteratively. Accordingly, other implementations are within the scope of the following claims.

What is claimed is:

1. An article comprising a machine-readable medium on a mobile device storing instructions for causing data processing apparatus to perform operations comprising:

displaying a first user interface for data retrieval on the mobile device without accessing a browser application, the first user interface having a structure predefined by layout data included at an installation of the first user interface, wherein the first user interface is adapted to receive information from a user and to generate a data retrieval request that includes the information;

displaying, on the mobile device, a second user interface for displaying data retrieved from a predetermined remote location in response to the data retrieval request, wherein the retrieved data includes at least one hyperlink and is displayed within the second user interface in accordance with the layout data included at the installation;

retrieving markup-language-formatted data associated with a user selection of the at least one hyperlink displayed in the second user interface; and rendering the markup-language-formatted data on the mobile device in accordance with the layout data included at the installation without accessing a browser application.

2. The article of claim 1 wherein the predetermined remote location comprises a pre-stored address on the mobile device and an address for retrieving the markup-language-formatted data is identified in the retrieved data.

3. The article of claim 1 wherein the retrieved data comprises structured data having a structure corresponding to the layout data included at the installation.

4. The article of claim 1 wherein at least one of the first user interface or the second user interface includes a user interface component for launching a predefined function, wherein the user interface component and the predefined function are defined by the layout data included at the installation.

5. The article of claim 1 wherein the predefined function comprises retrieving additional data and the machine-readable medium stores instructions for causing data processing apparatus to perform further operations comprising displaying a third user interface on the mobile device, the third user interface displaying the additional retrieved data in accordance with a structure corresponding to the predefined function and defined by the layout data included at the installation.

6. The article of claim 1 wherein rendering the markup-language-formatted data on the mobile device comprises adjusting a display of the rendered markup-language-formatted data based on at least one characteristic of the mobile device.

7. The article of claim 1 wherein the instructions comprise software code written using at least one of Java, Java 2 Platform Micro Edition (J2ME), Binary Runtime Environment for Wireless (BREW), Symbian operating system, a native operating system, Linux, a Pocket PC operating system, Palm operating system, a Microsoft operating system, or another mobile software platform.

8. A method for retrieving information to a mobile device, the method comprising:

receiving a request to display a first user interface for data retrieval on the mobile device;

displaying the first user interface on the mobile device without accessing a browser application and in response to the request, the first user interface having a structure predefined by layout data included at an installation of the first user interface, wherein the first user interface is adapted to receive information from a user and to generate a data retrieval request;

displaying, on the mobile device, a second user interface for displaying data retrieved from a predetermined remote location in response to the data retrieval request, wherein the retrieved data includes at least one hyperlink and is displayed in accordance with the layout data included at the installation;

retrieving markup-language-formatted data associated with a user selection of the at least one hyperlink displayed in the second user interface; and rendering the markup-language-formatted data on the mobile device in accordance with the layout data included at the installation without accessing a browser application.

9. The method of claim 8, wherein the predetermined remote location comprises a pre-stored address on the mobile device and an address for retrieving the markup-language-formatted data is identified in the retrieved data.

10. The method of claim 8, wherein the retrieved data comprises structured data having a structure corresponding to the layout data included at the installation.

11. The method of claim 8, wherein at least one of the first user interface or the second user interface includes a user interface component for launching a predefined function, wherein the user interface component and the predefined function are defined by the layout data included at the installation.

12. The method of claim 11, wherein the predefined function comprises retrieving additional data, and the method further comprises displaying a third user interface on the mobile device, the third user interface displaying the additional retrieved data in accordance with a structure corresponding to the predefined function and defined by the layout data included at the installation.

13. The method of claim 8, wherein rendering the markup-language-formatted data on the mobile device comprises adjusting a display of the rendered markup-language-formatted data based on at least one characteristic of the mobile device.

14. A mobile device comprising:

a memory storing:
  interface structure data that defines a layout of a first user interface for data retrieval, the interface structure data included at an installation of the first user interface on the mobile device; and
  information structure data that defines a layout of a second user interface, the information structure data included at an installation of the first user interface on the mobile device; and a processor operable to:
  receive a first request to display the first user interface on the mobile device;
  retrieve the interface structure data from the memory in response to the first request;
  display the first user interface on the mobile device without accessing a browser application, the first user interface having a structure predefined by the interface structure data retrieved from the memory, wherein the first user interface is adapted to receive information from a user and to generate a data retrieval request that includes the information;
  display, on the mobile device, a second user interface for displaying data retrieved from a predetermined remote location in response to the data retrieval request, wherein the retrieved data includes at least one hyperlink and is displayed within the second user interface in accordance with the information structure data stored in the memory;
  retrieve markup-language-formatted data associated with a user selection of at least one hyperlink displayed in the second user interface; and render the markup-language-formatted data on the mobile device in accordance with layout data included at the installation without accessing a browser application.

15. The mobile device of claim 14, wherein the predetermined remote location comprises a pre-stored address on the mobile device and an address for retrieving the markup-language-formatted data is identified in the retrieved data.

16. The mobile device of claim 14, wherein the retrieved data comprises structured data having a structure corresponding to layout data included at the installation.

17. The mobile device of claim 14, wherein at least one of the first user interface or the second user interface includes a user interface component for launching a predefined function, wherein the user interface component and the predefined function are defined by data stored in the memory.

18. The mobile device of claim 17, wherein the predefined function comprises retrieving additional data and the processor is further operable to display a third user interface on the mobile device, the third user interface displaying the additional retrieved data in accordance with layout data included at the installation and stored in the memory.

19. The mobile device of claim 14, wherein rendering the markup-language-formatted data on the mobile device comprises adjusting a display of the rendered markup-language-formatted data based on at least one characteristic of the mobile device.

* * * * *